(12) United States Patent
Gahler et al.

(10) Patent No.: US 7,651,561 B2
(45) Date of Patent: Jan. 26, 2010

(54) COATING COMPOSITION, PARTICULARLY FOR GLASS SURFACES, AND METHODS FOR THE PRODUCTION AND USE THEREOF

(75) Inventors: Siegfried Gahler, Wolfen (DE); Hans-Juergen Mueller, Sandersdorf (DE); Reinhard Borek, Halle (DE); Frank Meier, Halle (DE); Thomas Rainer, Wernigerode (DE); Jochen Schneider, Halle (DE); Stefanie Heimrich, Merseburg (DE)

(73) Assignee: boraglas GmbH, Halle/Saale (DE)

( * ) Notice: Subject to any disclaimer, the term of this patent is extended or adjusted under 35 U.S.C. 154(b) by 716 days.

(21) Appl. No.: 10/528,301

(22) PCT Filed: Oct. 24, 2003

(86) PCT No.: PCT/EP03/11817

§ 371 (c)(1),
(2), (4) Date: Mar. 17, 2005

(87) PCT Pub. No.: WO2004/039740

PCT Pub. Date: May 13, 2004

(65) Prior Publication Data

US 2005/0239004 A1    Oct. 27, 2005

(30) Foreign Application Priority Data

Oct. 29, 2002   (DE)  ................... 102 50 408

(51) Int. Cl.
   *C09D 1/00*        (2006.01)
   *G03C 1/00*        (2006.01)
(52) U.S. Cl. .................... 106/287.18; 106/287.19; 430/568

(58) Field of Classification Search ............ 106/287.18, 106/287.19; 430/430.1, 568
See application file for complete search history.

(56) References Cited

U.S. PATENT DOCUMENTS

| 4,292,400 A * | 9/1981 | Pollet et al. ................. 430/383 |
| 5,078,771 A | 1/1992 | Wu |
| 5,285,517 A | 2/1994 | Wu |
| 5,589,324 A * | 12/1996 | Wexler ....................... 430/529 |
| 6,238,847 B1 * | 5/2001 | Axtell et al. ................ 430/322 |
| 6,262,389 B1 | 7/2001 | Koyama et al. |
| 6,908,728 B2 * | 6/2005 | Endo et al. .................. 430/292 |
| 2003/0194658 A1 * | 10/2003 | Nishijima et al. ........... 430/350 |
| 2004/0118157 A1 | 6/2004 | Borek et al. |

FOREIGN PATENT DOCUMENTS

| DE | 215 776 A1 | 11/1984 |
| DE | 101 19 302 A1 | 10/2002 |
| EP | 1 110 921 A2 | 6/2001 |

OTHER PUBLICATIONS

Rainer, T. et al. In: "Farbige Innenbeschriftung von Floatgas durch $CO_2$-Laser-Bestrahlung", XP-001117571, pp. 127-130, (Jun. 1999).

* cited by examiner

*Primary Examiner*—David M Brunsman
(74) *Attorney, Agent, or Firm*—Vangelis Economou; Economou IP Law

(57) ABSTRACT

Coating compositions, in particular for laser-supported treatment (in particular inscription) of glass surfaces are described, wherein the coating compositions contain at least one silver compound which is soluble in an aqueous and/or organic solvent and contains at least one binder. Methods for producing such coating compositions and methods for coating and treating glass surfaces are also described.

13 Claims, No Drawings

COATING COMPOSITION, PARTICULARLY FOR GLASS SURFACES, AND METHODS FOR THE PRODUCTION AND USE THEREOF

CROSS-REFERENCE TO RELATED APPLICATIONS

This is a U.S. National Phase application of copending PCT application No. PCT/EP03/011817 filed on Oct. 24, 2003.

BACKGROUND OF THE INVENTION

Field of the Invention

This invention relates to coating compositions, in particular for laser-supported treatment (in particular inscription) of glass surfaces, methods for coating glass surfaces and methods for producing such coating compositions.

Methods for applying inscriptions in or to glass materials are known in general. For example, inscriptions can be produced on glass surfaces by printing methods, adhesive methods or etching methods. However, such inscriptions alter the surface of the glass or the inscriptions do not have adequate stability with respect to external mechanical influences. According to German Democratic Republic Patent DD 215 776, inscriptions are applied in the interior of the glass by applying diffusion paints or disperse paints to the glass surface and then tempering for several hours. Such diffusion paints or pigments, which often consist of preparations containing silver, may also be used in decals that are glued onto the glass that is to be labeled before tempering. The tempering causes the colored pigment to diffuse into the glass, where it results in a yellow to dark brown transparent inscription in the interior of the glass. Such tempering which can also be performed by infrared laser radiation, however, requires reaching temperatures that must be above the transformation temperature of the glass in order for the fused glass which occurs to be able to anchor the pigments in the glass surface. This in turn results in irregularities, turbidity or distortion of the inscription created in the glass, which thus greatly limits the applicability of these methods.

These disadvantages can be avoided by a method for laser beam-supported input of metal ions into glass for producing colorless and colored pixels. This method, which is described in the unpublished German Patent Applications DE 101 19 302.5 and PCT/EP02/04 284, operates at temperatures below the transformation temperature of the glass. It makes it possible to form silver inscriptions or silver images in glass materials. However, this technique requires that the corresponding silver compounds be deposited directly on the glass before the laser treatment. So far there are no suitable techniques for doing so. The abovementioned diffusion paints or diffusion pigments are not suitable for such deposition because diffusion of the colored pigment into the glass requires temperatures that must be above the transformation temperature of the glass.

The production of layers containing silver from aqueous solutions is known from silver halide photography. The layers containing silver halide must contain light-sensitive silver halides that are virtually insoluble in water and other solvents in a suitable binder matrix so that they cannot become mixed during preparation and subsequent photographic processing steps are made possible. These layers are characterized by undissolved silver halides and a particularly high binder content, so they have only limited suitability for the present glass coating tasks. It is also a disadvantage that the technological processes that are conventional in the production of photographic silver halide gelatin layers are bound to the high binder content.

SUMMARY OF THE INVENTION

The object of this invention is to provide improved coating compositions, in particular for glass materials that will have an expanded use range, in particular for preferably all possibilities of applying coating media for laser-supported inscription of glass materials. Another object of this invention is to provide methods for producing such coating compositions.

These objects are achieved with the coating compositions and methods having the references further described in greater detail below. Advantageous embodiments of this invention are derived from an understanding of the invention as disclosed.

DETAILED DESCRIPTION OF THE PREFERRED EMBODIMENTS

One of the basic ideas of the present invention is to provide a coating composition, in particular for laser-supported treatment of glass surfaces, such that said coating composition contains at least one silver compound which is soluble in an aqueous and/or organic solvent and also contains at least one binder. This invention also relates to coating compositions in both a liquid state in which they still contain solvent as well as in a solid state in which the solvent has been removed. In contrast with the photographic emulsions mentioned previously, the inventive coating compositions contain soluble silver compounds for forming the layers required for the laser inscription method. Thereby the ions are provided which diffuse into the glass during the laser treatment and are reduced to clusters only after entering the glass; these ions in their entirety produce the desired image effect. In addition, the inventive coating compositions also contain a binder with which the formation of the layer is improved.

Advantageously the particular requirements of a wide variety of application methods are met by the inventive coating compositions; these requirements pertain to the media used in application of media containing silver in particular, e.g., solutions of silver compounds, onto glass materials. Thus for example the wettability of the hydrophobic glass surface is provided in order to be able to create a uniform layer. If glass materials which are standing at an inclination are to be labeled in this position, the media that are used may be provided with a sufficiently high viscosity and may have a pasty character. If the metal compounds are to be applied by spraying of suitable solutions, then coating compositions according to this invention can be adapted to the application method through the choice of suitable solvents or solvent mixtures, in particular for the silver compounds, whereby the aforementioned requirements with regard to the wettability of the glass surfaces can be met. Furthermore, the solvents can be coordinated with regard to their rate of evaporation in the case of the spray process so that running in a vertical direction is prevented when working on inclined glass surfaces.

According to preferred embodiments of this invention, the coating composition comprises at least one silver compound and at least one additional metal compound, e.g., a zirconium compound. This can yield advantages for a particularly high contrast blackening effect or coloration of the treated glass. The combination of silver compounds with other metal compounds such as zirconium compounds may be advantageous for the image density achieved in the glass.

To promote the formation of clusters, the coating composition may advantageously contain at least one reducing agent with which the metal ions of the at least one metal compound (in particular silver compound) can be reduced. Reducing agents preferably include copper(I) and/or tin(II) and/or iron (II) and/or lead(II) and/or cobalt(II) and/or titanium(II) and/or complex systems such as iridium(II) hexachloride and/or cyanoferrates(II). The reducing agents are capable of also diffusing into the glass, depending on the selected circumstances, in the laser treatment and reinforcing the process of reduction of the silver ions there, increasing the number or shape of the clusters of the silver aggregates thus created or changing in the direction of a higher light absorption capability.

Additional advantages with respect to the formation of particularly homogeneous and stable layers may be obtained when the coating composition contains at least one additional substance with which the viscosity, the volume, the drying rate, the evaporation rate, the wettability and/or stability of the coating composition can be influenced. Examples include disinfectants in the case of use of gelatin as a binder matrix or flow control agents to ensure good and rapid spreading of the coating medium applied to the substrate or viscosity-increasing agents and antisedimentation compounds which result in an improved stability of the coating medium and counteract separation, and in the case of use of the coating media as a paste, result in a better uniformity of the layer.

The addition of drying regulators such as silanes contributes toward an improvement in the uniformity of the applied layer.

Other advantages with respect to the creation of images or inscriptions may be obtained if the coating composition also contains additives in the form of dyes and/or pigments and/or adhesion-improving agents and/or wetting agents. The recognizability of a layer applied to glass can be increased with the use of dyes or pigments. Furthermore wetting agents and adhesion-improving agents may be incorporated into the coating mixtures in order, for example, to keep the surface tension of the coating media as low as possible and achieve a coating without any disturbances in wetting on the glass surface or the film surface. Such wetting agents and adhesion-promoting agents may include any of the wetting agents known from photographic emulsions or other coating technique fields such as fluorosurfactants, dismulgans, high-molecular alkyl aryl ethers, polyethylene glycols, etc.

Important features of the inventive coating composition include the adjustment of a certain silver compound/binder weight ratio, which is selected according to the type of practical application.

In relation to the silver compound, only the smallest possible amount of binder is present so that the laser beam is absorbed as little as possible by the binder and the energy of the laser is available to the greatest possible extent for introduction of the metal ions into the glass structure. For the case when the coating media are applied in advance to carrier films for the application, their absorption for the laser light used should also be as low as possible.

The binder content in the coating compositions or coating media according to this invention for the method of laser-supported treatment is so low that the usual technological processes used in the production of photographic silver halide gelatin layers can be used only to a very slight extent. The coating media having such a low binder content are not capable of being solidified after application to the film, e.g., when using gelatin as the binder, by cooling rapidly and drastically. Therefore, other application methods are used, and these methods in turn necessitate or permit yet other binder contents.

The binder quantities used in the proposed process must therefore be much lower than in the case of photographic emulsions to ensure the most intimate possible contact of the silver compound with the glass surface. The quantities of binder used must therefore be present only in an amount such that the adhesion of the silver compounds and other compounds present in the coating media to the glass surface is ensured by the binder matrix. Depending on the binders used and the coating methods used, silver compound/binder ratios of 100 to 8000 are sufficient, i.e., only 1/100 to 1/8000 parts by weight binder or even less are used per part by weight of a silver compound (e.g., silver compound). For the case when the coating medium should be applied to films for application, it is necessary to ensure that there is sufficiently good and uniform formation of a layer. For this case the silver compound/binder ratios may be lower and may be in the range of 0.05 to 1000. For the case when the layer is to be removed from the film after coating the film but before use, i.e., before application to the glass that is to be labeled by the laser treatment, these layers that are pulled away must have a sufficiently good mechanical stability, which advantageously requires ratios in the range of 0.05 to 10.

The silver compound/binder weight ratio is thus selected to be preferably in the range of 0.05 to 8000, in particular in the range of 1 to 4000, depending on the planned application method. These intervals represent relatively large ranges, which yields another advantage of this invention.

Another object of this invention is a method of laser-supported treatment of a glass surface comprising the steps of coating the glass surface with the coating composition described above and irradiating the coated glass surface with laser radiation corresponding to a predetermined laser treatment pattern consisting of irradiated and non-irradiated regions such that silver ions diffuse into the glass surface in the irradiated areas. The laser treatment pattern may comprise, for example, alphanumeric characters, an image such as a photographic scene and/or some other type of graphic illustration.

The imaging or inscription by laser treatment of the coated glass surface using laser radiation and creation of colorless and colored pixels (in particular blackened pixels) in spots or regions is preferably accomplished according to the methods described in unpublished German Patent Applications DE 101 19 302.5, PCT/EP02/04 284, and corresponding U.S. Published Patent Application publication No. 2004/0118157, published on Jun. 24, 2004, fully incorporated by reference herein, where appropriate. Reference is made in the present description to the details described in these publications. Reference is made in the present description to the details described in these publications.

Depending on the application, clear glass, milky white or precolored glass is used as the coated glass. The inventive imaging or inscription is advantageously resistant to wiping and weathering. The information inscribed in the glass can be changed only by destroying the glass itself.

According to a first embodiment of the inventive method, the glass surface is coated by application (deposition) of the coating composition in a dissolved liquid state, preferably by spraying, casting or rolling or by doctor application. It is therefore advantageously possible to coat curved and angled surfaces uniformly.

According to another embodiment of the inventive method, the coating is performed by application of the coating composition in a solid layer state. Application of the coating composition may include adhesion of a self-supporting film of the coating composition (e.g., thickness 5 µm or more) on the glass surface or a composite of the coating composition and the carrier film on the glass surface. In the first case, layers are produced on backing films and can be pulled away from the backing film and applied directly to the glass without the film which would absorb laser light, and then after the laser treatment these layers are easily removed again from the glass, like the layers on film. In the second case the backing film is pulled away from the glass surface after the laser treatment.

An advantageous method for applying the silver compounds thus consists in particular of the production of layers containing silver on films which can subsequently easily be applied to glass materials in any desired position. The present invention provides in this regard in particular silver-containing coating media which can be applied to the film. The advantage of this type of technological use is that after the laser treatment the film can easily be pulled away from the glass surface.

After the applications described above, the solutions and/or pastes applied to the glass are washed off after the laser treatment, which requires good removability of the applied coating media, e.g., by washing. The binders may also be optimized with respect to effective removal by washing.

For the case of application of the coating media by the spray method, solvents or solvent combinations may be selected which, on the one hand, allow a sufficiently high silver content with regard to their solubility and, on the other hand, do not cause the binders to flocculate but instead permit their complete or colloidal solution. Depending on the binders selected, the solvent may be, for example, water, alcohols, ketones or ethers and mixtures thereof.

Suitable binders include, for example, the natural polymers known from the production of photographic emulsions, e.g., gelatin, casein, albumin, polysaccharides or artificial polymers such as polyethylene glycols, polyvinyl alcohols, polyvinyl pyrrolidones, cellulose acetates, polyvinyl formals and butyrals, polystyrenes, copolymers of vinyl chloride and vinyl acetate, hyaluronic acid, etc. As an alternative, mixtures of several binders may also be used.

Silver compounds that can be used include those which have a high solubility in water or organic solvents such as silver nitrate, silver fluoride, silver acetate, silver chlorate, silver perchlorate, silver citrate, etc. The solvents that are used may be coordinated according to the given application so that the silver compounds remain in solution.

Depending on the application method, it is preferable if the solvents are mutually miscible in addition to being able to dissolve the silver salts and binders (polymers). For the case of use of the coating media in a spray method with a dual-nozzle technique or a multi-nozzle technique, this miscibility is only necessary to a lesser extent.

For the case of using films for the inscription method, films of polycarbonate, polyethylene, polyethylene terephthalate, polyethylene naphthalate, cellulose triacetate, polyvinyl chloride, polypropylenes, etc. may be used, for example. Advantageously, the thickness of the films is as low as possible so that the films will cling to the glass, and thus the most intimate possible contact between the silver layer and the glass is achieved.

In the method using films as well as in the other forms of applying the coating media mentioned above to the glass surface, the fastest possible drying of the applied coating media is advantageous. To do so, the solvent content in the coating medium, the rate of application and the amount applied, the layer thickness and the rate of evaporation of the solvents are coordinated through essentially known technological measures. The rate of evaporation should be set as high as possible. This requires rapid heating of the applied layer without causing bubbles to form due to the evaporating solvent and requires rapid removal of the evaporated solvent through a suitable air flow.

The technological conditions should also be selected so that the drying rate is higher than the crystallization rate of the dissolved silver compounds so that the smallest possible crystals of the silver compounds are obtained in the silver layer on the glass or on the films used. Small crystals of the silver compounds contribute significantly toward achieving the most intimate possible contact with the glass surface.

Another object of this invention is to provide a method for producing the coating composition described above, including the steps of preparing a mixture of a first solution of the at least one silver compound in an aqueous and/or organic solvent and a second solution of the at least one binder in an aqueous and/or organic solvent and coating a surface of a support with the mixture and subsequently removing the solvent.

EXEMPLARY EMBODIMENTS OF THE PRODUCTION OF THE INVENTIVE COATING MEDIA

Example 1

Solution A: 20 g gelatin is allowed to swell in 100 mL water at room temperature for two hours and then dissolved while stirring at 60° C.

Solution B: 20 g silver nitrate is dissolved at room temperature in 100 mL distilled water.

Solution C: 10 g polyethylene glycol with an average molecular weight of 1000 is swollen for two hours at room temperature in 100 mL water and then dissolved while stirring and heating to 50° C.

Solution D: 10 g polyalkyl sulfone is dissolved in 100 mL ethanol.

To 5 mL solution A is added 50 mL solution B at room temperature and mixed well. Then 5 mL solution C is added to this mixture while stirring. In addition, 1 mL of solution D is added as a wetting agent. After a stirring time of five minutes, the coating medium with a ratio of silver compound to binder of 6.67:1 is ready for use.

Working at a temperature of 70° C., this solution can be applied to a polyethylene terephthalate film with a wet layer thickness of 50 µm in a horizontal position and dried with hot air and then applied to suitable glass materials for the laser treatment. The result is an inscription in the glass which corresponds to the controlled laser beam.

Example 2

Solution A: 10 g silver nitrate is dissolved in 100 mL distilled water at room temperature.

Solution B: 0.5 g polyethylene glycol with an average molecular weight of 800,000 is swollen for one hour in 100 mL 1-methoxy-2-propanol at room temperature and then dissolved to form a colloid by heating to 60° C. while stirring.

Solution C: 10 mL alkyl phenyl polyethylene glycol is dissolved in ethanol to yield 100 mL.

To prepare the coating medium, 12 mL of solution A and 7.5 mL solution B are mixed slowly at 70° C. while stirring vigorously. After 30 minutes, the mixture is cooled to 40° C. and 7.5 mL solution C and 10 mL ethanol are added. After a short stirring time, 2 mL nitric acid (2%) and 0.1 mL of a 20% acetic acid solution of zirconium acetate are added and stirred well for five minutes.

This coating medium has a ratio of silver compound to binder of 3032:1. It can be applied to a film according to Example 1 without further dilution and the laser recording technique can be used.

If the coating is applied by the spray method, the coating medium is mixed in a quantity ratio of 1:1 with ethanol before application.

Example 3

Solution A: 5 g silver fluoride is dissolved at room temperature in 100 mL distilled water to which 10 mL nitric acid (2%) has previously been added.

Solution B: 0.1 g polyethylene glycol with an average molecular weight of 8 million is swollen first at room temperature for two hours in 100 mL of a mixture of 50 mL water and 50 mL 1-methoxy-2-propanol and then dissolved while stirring at 70° C. to form a colloidal solution.

Solution C: 10 mL alkyl phenyl polyethylene glycol is dissolved in ethanol to form 100 mL.

To prepare the coating medium, 8 mL of solution A is mixed thoroughly with 5 mL of solution B by stirring at 50° C. Then 2 mL of solution C is added. The resulting coating medium is filtered and is then available for use according to Examples 1 and 2. It has a silver compound/binder ratio of 80:1.

Example 4

Solution A: 2 g silver nitrate is dissolved in 98 mL ethanol at room temperature.

Solution B: 10 g polyvinyl butyral with an acetal content of approximately 77% is dissolved in 90 mL ethanol at room temperature. To prepare the coating medium, start with 9 mL of solution B and stir in 9 mL of solution A. Then 0.35 mL Additol XL 104 is added as a plasticizer while stirring.

After filtration, the resulting mixture is applied to a 100 μm thick PET film and dried. For the laser inscription, the silver nitrate-containing binder layer is pulled away from the substrate, applied to the glass that is to be inscribed and treated using a laser by the method described in Example 1. The coating medium produced in this way corresponds to a silver compound/binder ratio of 1:5.

Example 5

Solution A: 2 g hyaluronic acid is swollen in 100 mL cold water for four hours and then liquefied by heating to 70° C. while stirring vigorously to form a homogeneous mass.

Solution B: 50 g silver nitrate is dissolved in distilled water at room temperature to yield 100 mL.

Solution C: 4 g sodium sulfosuccinic acid-2-ethylhexanol ester is dissolved in 100 mL water.

To prepare the coating medium, solution A and solution B should be mixed thoroughly together with 10 mL solution C to form a homogeneous mass.

This pasty coating medium with a silver nitrate-hyaluronic acid ratio of 25:1 is applied to the glass that is to be coated and is dried. This is followed by the laser treatment which leads to a recording in the glass according to the computer control.

The invention claimed is:

1. A coating composition for a laser-supported treatment of glass surfaces, comprising at least one compound including silver which is soluble in one or more of a group of compositions consisting of an aqueous solvent and an organic solvent and further comprising at least one binder, the resulting solution including the silver ions providing the capability of the silver ions to diffuse into the glass during the laser treatment and clusters of silver ions being reduced only upon diffusing into the glass to thereby produce the desired image effect in the interior of the glass.

2. The coating composition according to claim 1, further comprising at least one additional metal compound.

3. The coating composition according to claim 2, wherein the additional metal compound further comprises a zirconium compound.

4. The coating composition according to claim 1, wherein the at least one binder further comprises at least one compound selected from the group consisting of natural and synthetic polymers.

5. The coating composition according to claim 1, further comprising at least one additional substance for providing at least one of the following characteristics to the coating composition: the viscosity, the volume, the drying rate and rate of evaporation, the wettability or the stability of the coating composition.

6. The coating composition according to claim 1, further comprising at least one reducing agent capable of reducing the metal ions of the at least one compound including silver or the additional metal compound.

7. The coating composition according to claim 6, wherein the at least one reducing agent is a system selected from the group consisting of copper(I), tin(II), iron(II), lead(II), cobalt(II), titanium(II) or comprises a complex systems selected from the group of compounds consisting of iridium(II) hexachloride and cyanoferrates(II).

8. The coating composition according to claim 1, further comprising at least one additive selected from the group of compounds consisting of dyes and pigments.

9. The coating composition according to one of the preceding claim 1, further comprising at least one additive selected from the group of compounds consisting of adhesion-improving agents and wetting agents.

10. The coating composition according to claim 1, wherein the coating composition has a silver compound/binder weight ratio in the range of from 0.05 to 8000.

11. A coating composition for a laser-supported treatment of glass surfaces, comprising at least one compound, including silver, which is soluble in one or more of a group of compositions consisting of an aqueous solvent and an organic solvent and further comprising at least one binder coating composition, wherein the silver compound/binder weight ratio is in the range of from 1.0 to 4000.

12. A coating composition for laser-supported treatment of glass surfaces comprising at least one compound, including silver, which is soluble in one or more of a group of compositions consisting of an aqueous solvent and an organic solvent, the resulting solution including the silver ions, and providing the capability of the silver ions to diffuse into the glass during the laser treatment and clusters of silver ions being reduced only upon diffusing into the glass to thereby produce the desired image effect in the interior of the glass, the composition further comprising at least one binder, wherein the silver compound/binder weight ratio is in the range of from 1.0 to 4000.

13. The coating composition according to claim 12, further comprising at least one additional metal compound.

* * * * *